(12) United States Patent
Ahmed et al.

(10) Patent No.: US 12,401,588 B2
(45) Date of Patent: Aug. 26, 2025

(54) AUTOMATIC CREATION OF ADAPTIVE APPLICATION AWARE ROUTING POLICIES ON A SOFTWARE-DEFINED WIDE AREA NETWORK (SD-WAN)

(71) Applicant: Cisco Technology, Inc., San Jose, CA (US)

(72) Inventors: Syed Arslan Ahmed, Bengaluru (IN); Raj Venkatesan, Mill Valley, CA (US); Ashish Sood, Cupertino, CA (US); Balaji Sundararajan, Fremont, CA (US); Mahalakshmi Rajaram, Fremont, CA (US); Yogesh Mittal, Sunnyvale, CA (US); Ankur Bhargava, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/386,203

(22) Filed: Nov. 1, 2023

(65) Prior Publication Data
US 2025/0062986 A1 Feb. 20, 2025

(51) Int. Cl.
| | | |
|---|---|---|
| H04L 12/24 | (2006.01) | |
| H04L 41/0803 | (2022.01) | |
| H04L 45/00 | (2022.01) | |
| H04L 45/02 | (2022.01) | |
| H04L 45/302 | (2022.01) | |

(52) U.S. Cl.
CPC .......... *H04L 45/3065* (2013.01); *H04L 45/02* (2013.01); *H04L 45/22* (2013.01)

(58) Field of Classification Search
CPC ...... H04L 45/3065; H04L 45/02; H04L 45/22

USPC .......................................................... 709/238
See application file for complete search history.

(56) References Cited

U.S. PATENT DOCUMENTS

| | | | |
|---|---|---|---|
| 11,463,365 B1 * | 10/2022 | Vasseur | H04L 47/122 |
| 2003/0133443 A1 * | 7/2003 | Klinker | H04L 45/123 |
| | | | 370/353 |
| 2015/0143456 A1 | 5/2015 | Raleigh et al. | |

(Continued)

OTHER PUBLICATIONS

Search Report and Written Opinion for International Application No. PCT/US2024/042450, Dated Dec. 17, 2024, 14 pages.

(Continued)

*Primary Examiner* — Moustafa M Meky
*Assistant Examiner* — Elizabeth Kassa
(74) *Attorney, Agent, or Firm* — Lee & Hayes, P.C.

(57) ABSTRACT

This disclosure describes techniques for improving routing policy awareness in a network. The method includes detecting, by a controller, an application initiated for use at an edge node of a network. Then, generating, by an analytics engine coupled to the controller, analytical data of traffic flow at the edge node of the network wherein the traffic flow is in accordance with a routing policy for routing traffic associated with the application. Further, routing of the traffic through a path from one or more paths configured at the edge node that is in accordance with at least a Service Level Agreement (SLA) for traffic flow. Also, in response to an SLA violation during routing of the traffic, causing an action, by the controller, of routing traffic flow through another path that is in accordance with at least the SLA for traffic flow based on analytical data received of the traffic flow.

20 Claims, 7 Drawing Sheets

(56) References Cited

U.S. PATENT DOCUMENTS

| | | | |
|---|---|---|---|
| 2018/0131616 A1* | 5/2018 | LaBerge | ............... H04L 45/02 |
| 2020/0153701 A1 | 5/2020 | Mohan et al. | |
| 2020/0328978 A1 | 10/2020 | Gupta et al. | |
| 2021/0194805 A1 | 6/2021 | Li | |
| 2022/0014163 A1 | 1/2022 | Marek et al. | |
| 2022/0060393 A1* | 2/2022 | Vasseur | ............... H04L 43/08 |
| 2022/0070086 A1* | 3/2022 | Mermoud | ............... G06N 7/01 |
| 2023/0080537 A1* | 3/2023 | Ramanathan | ....... H04L 47/2475 |
| | | | 709/238 |
| 2023/0231768 A1 | 7/2023 | Vysotsky et al. | |

OTHER PUBLICATIONS

Cisco, Cisco SD-WAN Policies Configuartion Guide, Cisco IOS Release 17.X, Mar. 17, 2020.

* cited by examiner

AUTOMATIC CREATION OF ADAPTIVE APPLICATION AWARE ROUTING POLICIES ON A SOFTWARE-DEFINED WIDE AREA NETWORK (SD-WAN)

RELATED APPLICATIONS

This application claims priority to Indian Provisional Patent Application No. 202341055375, entitled "AUTOMATIC CREATION OF ADAPTIVE APPLICATION AWARE ROUTING POLICIES ON SD-WAN CONTROLLERS BASED ON INTENT BASED NETWORK FEEDBACK", filed on Aug. 18, 2023, the entire contents of which are incorporated herein by reference.

TECHNICAL FIELD

The present disclosure relates generally to improving policy distribution across a network based on application awareness policies of the network, thereby improving the performance of the network.

BACKGROUND

Cloud computing provides users with access to computing resources to fulfill users' computing resource needs. In some examples, service providers can manage and provide cloud computing resources to users to fulfill their needs without the users having to invest in and maintain their computing infrastructure. Cloud computing often involves the use of networks of data centers that house servers, routers, and other devices that provide computing resources to users such as computing resources, networking resources, storage resources, database resources, application resources, and so forth. Users may be allocated portions of the computing resources using virtualization technology that remain available for peak demands of the users. The virtualized portions, or virtualized networks, of computing resources, may be scaled up (or down) according to the computing needs of a given user without the need to maintain excess computing capacity. Management of the flexible, virtualized networks may be performed by software-defined networking.

In software-defined networking, software-defined access (SDA) may be used to manage the routing of data from source devices to destination devices across a virtualized network. The routing of data may pass through nodes (e.g., edge nodes), which forward the data along to destination devices with which they are associated. Policies may be created that define which destination devices may receive data from which source devices. In this respect, the node can be considered a point of enforcement of a policy. For example, a node may receive data from the network, and then forward the data to an appropriate destination device based on a particular policy. As the virtualized network structure changes with changing cloud computing resource demands, the policies may need to be updated. Thus, policies stored at the node may become out-of-date, potentially leading to errors in data routing. Intent-Based Networks (IBN) builds on software-defined networking (SDN), by using a network controller that acts as a central control point for network activity. Also, Intent-based Networking has emerged in the management of different networking areas, such as Software Defined Access (SDA), Software-Defined Wide-Area Networks (SD-WANs), Applicant-Centric Infrastructure (ACI), and so forth.

The existing mechanism of use of an Application-Aware Routing (AAR) policy in SD-WANs is static in terms of definition and reactive in nature and switches paths after a Service Level Agreement (SLA) violation has occurred. Also, the current SD-WAN solution enabling the use of an AAR policy may require customers to manually create the AAR policies for each application/group and site after knowledge of their network and WAN links and may also require customers to know what are the SLA thresholds that should be defined for the applications. More often than not, the thresholds used do not reflect the requirements of the application with accuracy or with sufficient accuracy. For example, when multiple paths are available: an AAR policy enabled may simply route traffic through any available path without considering which is a better path amongst two or more paths unless a preferred path is set in the AAR definition. AAR policy routes the traffic through the other available path when an SLA violation occurs on the first path, making it reactive. If a preferred path is set, it is static and does not change unless a customer changes it. The preferred paths may change frequently due to changes in the ISP network.

Once defined, customers rarely revisit the AAR policy configurations or preferred paths. The policy with its preferred paths and SLA thresholds may become stale and AAR may lose its efficacy over time.

Therefore, it may be advantageous to optimize the distribution of policies across the network with automatic adaptive and accurate definitions, and application of AAR policies on an SDWAN/Autonomous network to improve the application SLA for business-critical applications in the network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
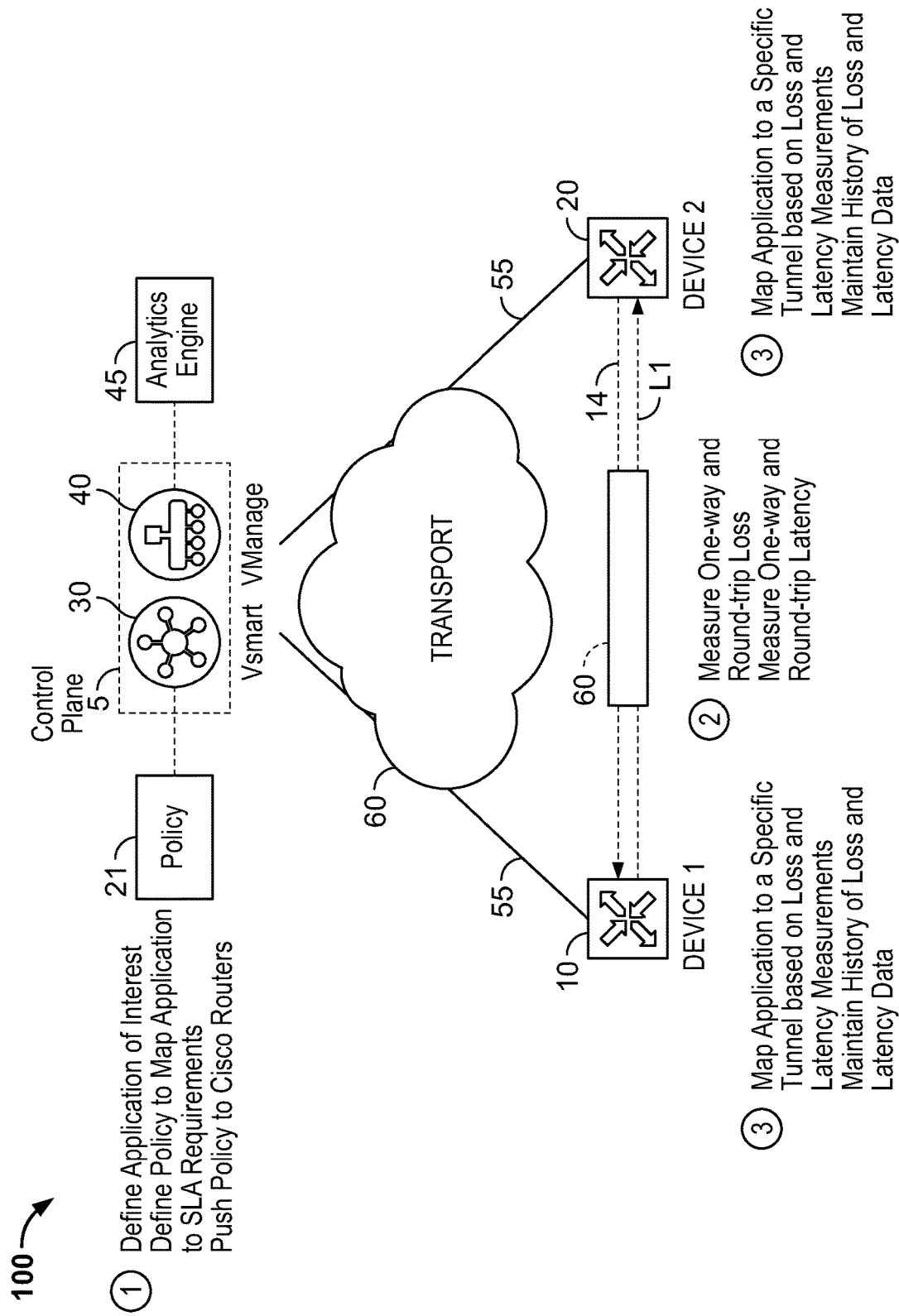
FIG. 1 illustrates a diagram of an Application-Aware Routing (AAR) process and system according to some embodiments.

This disclosure describes a method to manage the distribution of policies across the network. The users of an intent-based network manually create the AAR policies.

In some embodiments, a computer-implemented method is provided of ingesting feedback from an analytics engine in an intent-based network to automatically generate and continuously adapt Application-Aware Routing (AAR) Policies with dynamic updates to preferred paths to provide accurate and proactive policy for business-critical applications and improve the application quality of experience.

In some embodiments, the method for automatically creating AAR policies on Software-defined Wide Area Network (SD-WAN) controllers based on intent-based network feedback, including enabling an adaptive mechanism by which an SD-WAN controller or a network management system relies upon network insights generated by analytics components to automatically create the AAR policies in a customer's network in which the AAR policies can be dynamically updated based on the feedback from the network and newer data so that the policies reflect the intent despite the dynamic nature of the network.

In some embodiments, the controller may be configured to detect an application for use at an edge node of a network and an analytics engine coupled to the controller may be configured to generate analytical data of the traffic flow of the network wherein the traffic flow is by at least a routing policy for routing traffic associated with the application.

In some embodiments, the controller may be configured to route the traffic through a path comprising one or more paths configured at an edge node that is by at least a Service Level Agreement (SLA) for traffic flow; and in response to an SLA violation during routing of the traffic, causing an action of re-routing traffic flow through another path that is by at least the SLA for traffic flow based on analytical data received from the analytical engine of the traffic flow. In an embodiment, the action caused by the controller may include re-routing the traffic flow by another path that is based on the analytical data and by at least a routing policy associated with the application.

In some embodiments, the controller may be configured to change or adjust an SLA threshold for routing traffic by the routing policy that may include a set of requirements associated with the application for routing of application based on analytical data received of traffic at an edge node.

In some embodiments, the controller may be configured to enforce a routing policy automatically based on at least one type of application that is detected for a perceived quality for the application-based traffic.

In some embodiments, the controller may be configured to update automatically, by the controller, based on feedback analytical data received of the traffic flow generated by the analytics engine, and the routing policy at the edge node. The updated routing policy is reflective of the intent of the routing policy associated with the application by the controller.

In some embodiments, the controller may be configured to enable a preferred path based on statistical analysis from the analytics engine of one or more paths for routing the traffic. The preferred path comprises a path with a similar configured SLA for routing traffic. In some embodiments, the preferred path may include a path determined to have at least a lesser probability of an SLA violation when routing at least the application-based traffic.

In some embodiments, the controller is configured to proactively route traffic based on analytical data from the analytics engine, by selecting the preferred path for routing traffic.

In some embodiments, the controller is configured to update the preferred path based on available real-time data to ensure that the routing policy is maintained to be at least relevant for enabling routing traffic. The proactively routing traffic may include the selection of a preferred path by the controller that is dynamically adaptable to at least attempt to cause the routing policy to have an increase in the performance of the application-based traffic. In an embodiment, the controller may be configured as an SD-WAN controller.

In some embodiments, a system may include an analytics engine that is configured to analyze traffic flow in a network and is further configured to generate analytical information about at least one application from traffic data that is transmitted in the network, identify a plurality of attributes associated with at least one application by correlating the analytical information about at least one application to at least Service Level Agreement (SLA) boundary data in which at least one application operates in the network, and determine based at least on the plurality of attributes and by applying at least predictive analysis, a threshold of the SLA associated with at least one application for operating optimally in the network.

In some embodiments, the analytics engine is further configured to correlate analytical information with one or more paths that are available for routing traffic of at least one application across one or more edge devices of the network. In an embodiment, the analytics engine is further configured to determine an applicable threshold for an SLA policy and a preferred path across an edge device of the network. In another embodiment, the analytics engine is further configured to enable a controller coupled to the analytics engine to pull analytical information generated by the analytics engine to create an application-aware routing policy for at least one edge device associated with an application of the network.

In an embodiment, the analytics engine is further configured in response to the activation of an application-aware routing policy and selecting a preferred path for application traffic by a controller, retrieves updated data, and validates the preferred path for the application traffic based on an analysis of the updated data.

In some embodiments, a computing device is configured with one or more processors and computer-readable media storing executable instructions that cause the one or more processors to perform a set of operations to detect an application initiated for use at an edge node of a network, generate analytical data of traffic flow at the edge node of the network wherein the traffic flow is by a routing policy for routing traffic associated with the application, and route traffic through a path of the one or more paths configured at the edge node that is by a Service Level Agreement (SLA) for traffic flow. Also, in response to an SLA violation during the route of traffic, to re-route traffic through another path that is by at least the SLA for traffic flow based on analytical data received of the traffic flow in the network.

In some embodiments, one or more processors are instructed to configure an SLA threshold for routing traffic by the routing policy that includes a set of requirements associated with the application for routing application-based traffic using analytical data received from traffic at an edge node.

Additionally, the techniques described herein may be performed by a system and/or device having non-transitory computer-readable media storing computer-executable instructions that, when executed by one or more processors, performs the method described above.

EXAMPLE EMBODIMENTS

One of the features of SD-WAN solutions in the market is the ability to detect applications and apply network routing policies to them in the form of application aware routing policies. Customers can create Application aware routing (AAR) policies that direct the SD-WAN edge routers to route application traffic through paths that meet the required SLA as specified in the configuration.

When multiple paths are available, the AAR policy will route traffic through any of the available paths that meet SLA till an SLA violation occurs, and then switch the path to the other available path.

In some embodiments, SD-WAN solutions may be configured with the capability to detect applications and apply network routing policies to applications by application-aware routing policies. For example, customers may create Application-Aware Routing (AAR) policies that direct the SD-WAN edge routers to route application traffic through paths that meet the required Service Level Agreement (SLA) as specified in the configuration. When multiple paths are available, the AAR policy will route traffic through any of the available paths that meet SLA till an SLA violation occurs, and then switch the path to the other available path.

Application-aware routing tracks network and path characteristics of the data plane tunnels between SD-WAN devices and uses the collected information to compute optimal paths for data traffic.

In some embodiments, Application-aware routing tracks network and path characteristics of the data plane tunnels between SD-WAN devices and uses the collected information to compute optimal paths for data traffic. These characteristics include packet loss, latency, jitter, and the load, cost, and bandwidth of a link. The ability to consider factors in path selection other than those used by standard routing protocols-such as route prefixes, metrics, link-state information, and route removal on the SD-WAN device.

In network operation, the path taken by application data traffic through the network can be optimized, by directing it to WAN links that support the required levels of packet loss, latency, and jitter defined in an application's SLA.

In some implementations, the distribution may be managed based on an adaptive mechanism for components of the network, for adaptive policy distribution, a mechanism by which an SD-WAN controller or network management system can make use of network insights (based on statistical/predictive models based on various network telemetries like FNF data, network KPIs, bandwidth utilization and capacity, etc.) generated by analytics components (e.g., vAnalytics/WANI in Cisco) to automatically create accurate Application-Aware Routing policies for the customer's network. Furthermore, based on the feedback from the network and newer data the policy can be dynamically updated. For example, the conversation may be used to reduce the number of policies downloaded and/or installed at any given node of the network. Additionally, or alternatively, policies installed at the node may be deleted based on the conversation. As such, the distribution of policies may be improved, based on the conversation, for more efficient utilization of network resources.

As described herein, the SLA thresholds that are being defined for the given application in the AAR (application-aware routing) policy are accurate for the requirements of the given application. The AAR policy is automatically created for the SD-WAN network based on the applications detected and their perceived quality. The AAR policy is automatically updated based on the network feedback so that the policy reflects the intent despite the dynamic nature of the network. The AAR policy created could always select a preferred path based on a statistical analysis of all available or some portion of available paths (even with similar SLAs) to route traffic through the path with a lesser probability of an SLA violation, thereby making the solution proactive, instead of reactive. The preferred path could always be updated based on the latest data available and ensure that the policy does not become stale or lose its efficacy.

The adaptive-based policy distribution may improve the efficient utilization of cloud computing resources. Ever-greater flexibility is desired in virtualized network structures to handle the increasing demands of cloud computing resources. Software-defined networking may provide greater mobility related to data traffic among network devices. When challenged with increasing mobility, static policies to define working groups of network devices may be impractical. Further, downloading unrequired policies to points of enforcement may unnecessarily consume network bandwidth, and/or may produce more policy download errors. Untimely updating of policies at the points of enforcement may lead to data transmission errors. Additionally, where TCAM space on NADs is limited, there is a crucial need to optimize the utilization of TCAM by reducing the number of installed policies, and potentially only installing policies required at the point of enforcement Efficient deletion of policies that are no longer required may be similarly beneficial. With the adaptive-based policy distribution, a reduction of the number of policies downloaded and/or installed at any given point of enforcement may be significant. Furthermore, techniques consistent with conversation-based policy distribution may be able to assist data transfer across the network while not increasing latency over traditional policy distribution techniques.

As noted above, although the examples described herein may refer to a Network Access Device (NAD) as the point of enforcement of a policy, the techniques can generally be applied to any node in a network. Further, the techniques are generally applicable to any network of devices managed by any entity where virtual resources are provisioned. In some instances, the techniques may be performed by software-defined networking and/or software-defined access (SDA), and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to managing the distribution of policies across a network and adapting thresholds of AAR policies. For instance, the techniques described herein may reduce the amount of storage, dropped data, latency, and other issues experienced in networks due to lack of network resources and/or improper routing of data. By improving the distribution of policies across a network, the network communications performed by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a diagram of an Application-Aware Routing (AAR) process and system according to some embodiments. In FIG. 1, there is shown in the AAR process of network 100 a distributed architecture in which the control operations and analytics are centrally processed at a control plane 5 which is separated from the network devices. The Network 100 of FIG. 1 shows a mechanism configured for an automatic adaptive workflow that includes the various control and analytical elements of a controller 30 and an analytic module (i.e., dashboard-type configuration) 40. In some embodiments, controller 30 may be a CISCO® vSmart Controller ("vSmart Controller"), and analytic module 40 may be a CISCO® vManage module. The control plane 5 and its elements are in communication with one or more network devices such as the first device 10 (i.e., a router, an edge device), and the second device 20 (i.e., another router, edge device, etc.), that make up the distributed architecture of a separated controller from each connected router.

In some embodiments, the network 100, may be an SD-WAN network in which the centralized control policy is managed by the vSmart Controller that effectively acts as a routing engine of the network 100. In an exemplary embodiment, the vSmart Controller acts as the centralized manager of network-wide routes, maintaining a primary route table for these routes. The vSmart Controller may be configured to build its route table based on the route information advertised by the SD-WAN network devices in its domain and by using these routes to discover the network topology and determine the best paths to network destinations. The vSmart Controller distributes route information from its route table to the devices in its domain which in turn use these routes to forward data traffic through the network 100. The result of this architecture is that a central authority orchestrates networking-wide routing decisions and routing policy instead of being implemented hop by hop, by the devices in the network 100. The centralized control policy allows the influence of the network routes advertised by the vSmart Controller. This type of policy, which is provisioned centrally on the vSmart Controller, affects both the route information that the vSmart Controller stores in its primary route table and the route information that it distributes to the devices.

A centralized control policy is provisioned and applied by the vSmart Controller. The control policy configuration itself may not pushed to the network devices (i.e., in the overlay network), but what is pushed to the network devices, using the Overlay Management Protocol (OMP), are the results of the control policy, which the devices then install network-wide routes is administered centrally, using policies designed by network administrators.

The access policies 21 are implemented by the centralized vSmart Controller, which is responsible for orchestrating the routing decisions in the SD-WAN overlay network (i.e., the network 100).

In some embodiments, in an Overlay Management Protocol in an SD-WAN configuration, a controller (i.e., a "vSmart" controller) may be configured to perform the routing functions. The centralized control plane 5 policies are supported by monitoring and analytics generated by the analytic module 40 (i.e., the "vManage") that provides analytical data of application-based traffic to the controller 30 for making routing determinations and mapping-related decisions. Each edge router (i.e., each network device, devices 10, 20) calculates its security keys per link and distributes them to the controller 30 (i.e., the vSmart Controller). Controller 30 then redistributes the same to each edge router (other network devices 10, 20), depending on the access policies 21. The Controller 30 acts as the central intelligence hub of the SD-WAN fabric, providing control plane 5 services to orchestrate network operations. The Controller 30 is configured with a scalable architecture to allow it to handle up to or approximately 5,400 connections per server (i.e., vSmart server hosting the vSmart controller) allowing for large-scale deployments. The Controller 30 leverages the Overlay Management Protocol (OMP) to communicate and manage network information. The OMP may be configured that extends beyond routing determinations and can allow for other management including configuration updates. The OMP enables executions between controller 30 and the WAN Edges (via 55) within a secure tunnel (transport 50). Access policies 21 built through the management plane (control plane 5) are distributed to controller 30 (vSmart controller) via NETCONF, and it disseminates these policies to the WAN Edges through OMP updates.

In some embodiments, an analytics engine 45 of the analytic module 40 is operably connected or communicable to a vManage dashboard and monitors the traffic flow about each network device (devices 10, 20). The Analytics Engine 45 may be configured as a cloud-based analytic service for the SD-WAN network (i.e., network 100) that may be configured to deliver various insights into applications initiated by each network device (devices 10, 20) and the network performance by collecting data and implementing predictive solutions for path-based selections and recommendations. In some embodiments, the Analytics Engine 45 may be configured to make recommendations such as predictive path recommendations which can be applied to the SD-WAN network as TLOC preferences in AAR policies.

In some embodiments, the analytical module 40 (i.e., CISCO® Catalyst Analytics) is configurable as a customizable dashboard that collects network telemetry from each edge or network device (devices 10, 20) and may be configured to provide alerts on events and outages in the SD-WAN environment. In implementation, various Device Templates and overlay traffic policies created may be configured by a REST API and shared on the controller 30 to be applied to edge or network devices of the network 100.

In some embodiments, the controller 30 may be enabled to be adaptively configurable to define an application of interest and to define the routing policy 21 to map to the application from a set of access policies 21 configured with the control plane 5. The Controller 30 may be configured to push the access policies 21 to the edge or network devices (i.e., push access policies to one or more routers configured in the network 100).

In implementations, when the controller 30 is not required to redistribute some or all route information to one or all the network devices 10, 20 in a network (or domain), or when the route information is required or needed to be modified that was stored in a Controller's 30 route table or advertised by the Controller, a provisioning process may be executed at a centralized control policy (i.e. at the control plane 5).

In implementations, to activate the routing policy (i.e., a control policy), it may be applied to specific sites in the overlay network (network 100) in either the inbound or the outbound direction. In some embodiments, applying a centralized routing policy in the inbound direction enables filtering or modifying the routes being advertised by each network device before it is placed in the route table of Controller 30.

With reference to FIG. 1, there is illustrated a three-step process which includes: Step 1 in which controller 30 defines the application of interest, defines the routing policy 21 to map an application to SLA requirement, and pushes the routing policy 21 to the network devices 10, 20; Step 2 in which the controller 30 measures the one-way and round trip loss, and measures one way and round trip latency of a specific tunnel 60 between device 1 and device 2; and Step 3 in which the controller 30 maps an application to the specific tunnel 60 based on loss and latency measurements, and maintains a history of loss and latency.

Figure 2:
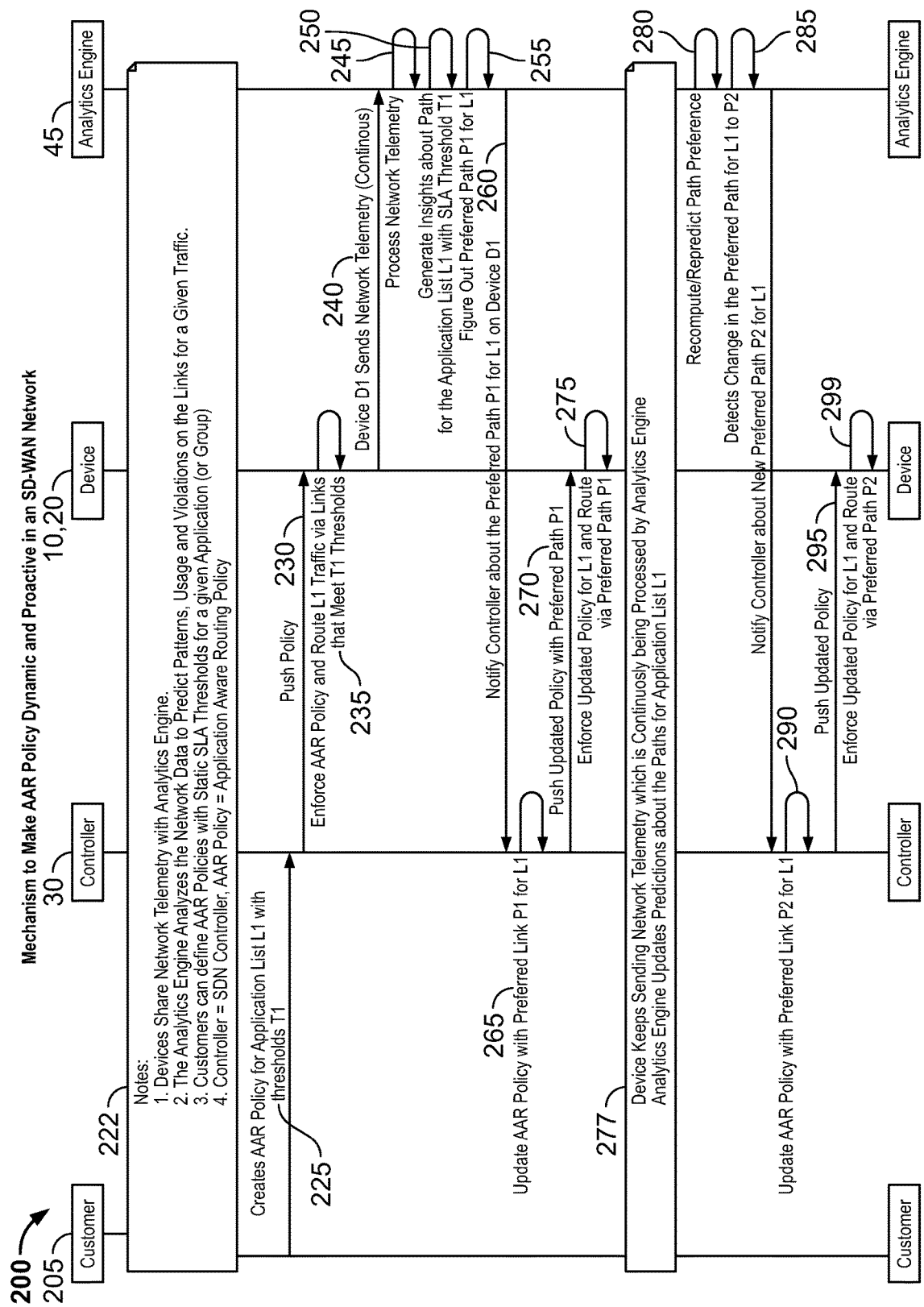
FIG. 2 is an exemplary diagram of the process flow of a mechanism to configure the dynamic and proactive process flow of the AAR policy in the SD-WAN network according to some embodiments.

FIG. 2 is an exemplary diagram of the process flow 200 of a mechanism to configure the dynamic and proactive process flow of the AAR policy in the SD-WAN network according to some embodiments. In FIG. 2, there is shown the process flow 200 in an SD-WAN network (Network 100 of FIG. 1) between Customer 205, the Controller 30; Device(s) 10, 20; and Analytics Engine 45. Initially, described in block 222, network 100 is configured with (1) the devices 10, and 20 sharing network telemetry with the Analytics Engine 45; (2) the Analytics Engine 45 configured to analyze the network data to predict patterns, usage, and violations for given traffic (i.e., application-based traffic); (3) The customers may define AAR policies with static thresholds for a given application or group of applications; and (4) the controller 30 may be configured as an SDN controller, and the Application-Aware Routing Policy (AAR policy) may be considered the routing policy defined or associated with an application.

At step 225, customer 205 may create an AAR policy for an Application List L1 with a threshold T1. The threshold T1 may be pre-set, configured with the application type, or set by the customer 205. At step 230, the routing policy (i.e., AAR policy) is pushed by the controller 30 to a particular device 10, 20, or a group of devices, a domain, etc. At step 235, at devices 10, and 20 both the AAR policy and route are enforced. In this instance, the AAR policy and the route L1 traffic which corresponds to the Application List L1 that is configured with the controller 30 (i.e., selected from an application list of families when provisioning the access policies) is enforced via links that meet a threshold T1 associated with the device 10, 20. At step 240, device 10 (D1 of FIG. 1) may be configured to send Network Telemetry (continuously) to the analytics engine 45.

The analytics engine 45 is configured at step 245 to process the network telemetry, at step 250 to generate insights about the path (route) selected for the Application List L1 with SLA thresholds T1, and at step 255 to determine a preferred path (route) for the Application List L1. Once the preferred path is determined by the analytics engine 45, at 260, controller 30 is notified about this decision, and the preferred path P1 for Application List L1 on Device 10 (d1). At step 265, the AAR policy is updated at controller 30 with the information of the preferred link P1 for Application List L1. At step 270, controller 30 may be configured to push the updated AAR policy with the preferred path P1 to device 10 (D1), and at 275, the information at Device 10 (D1) is enforced with the AAR policy (i.e., an access policy or like) for Application List L1 with the route via the preferred path for Application List L1.

Figure 3:
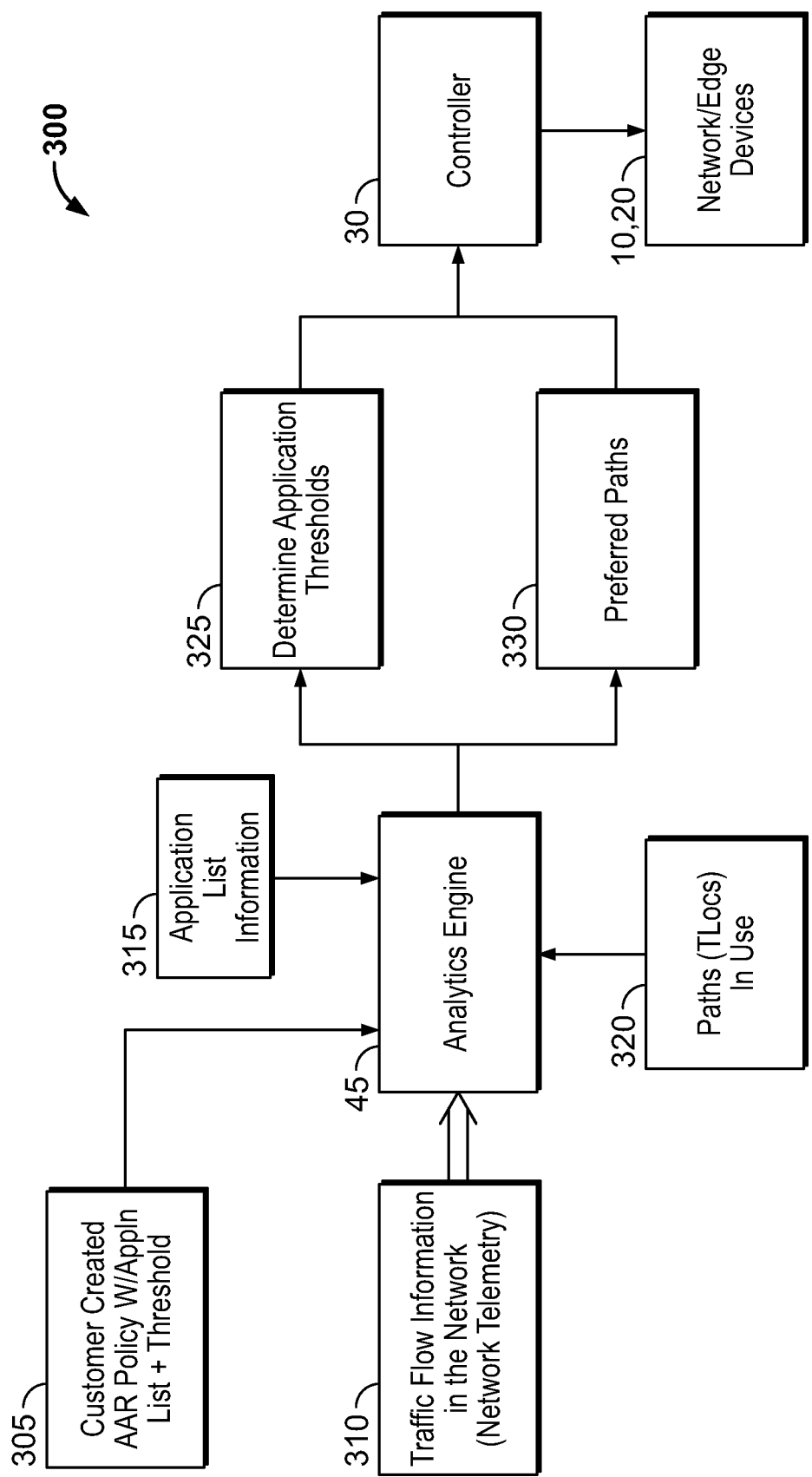
FIG. 3 is an exemplary diagram of a system of the inputs to Analytics Engine which is communicatively coupled to the controller and edge devices of the network according to some embodiments.

Referring to FIG. 3, as described in block 277, device 10 (D1) is configured to continue to keep sending network telemetry which is continuously processed by the analytics engine 45 so that updates of predictions about the paths for the Application List L1 are kept up to date and the efficiency is maintained in the path selections for the routes associated with the Application List L1. At step 280, as an example, the data is continuously received and recomputed by the analytics engine 45 so that the path preference is kept current based on real-time analytic data. At step 285, the analytics engine 45 is configured to detect changes in the preferred path for Application List L1 at a preferred link P2. Again, controller 45, similar to the prior notification of preferred path P1, notifies controller 30 about the new preferred path P2 for the Application List L1.

At step 290, controller 30 is updated with information on the updated AAR policy with the preferred link P2 for the Application List L2. Subsequently, and similarly, at step 295, the controller 30 pushes the updated policy to device 10 (D1), and device 10 (D1) at step 299 is configured to enforce the updated policy for Application List L1 and the route via the preferred path P2. In this way, the analytics engine 45 influences the paths in the route of a particular application list based on the feedback it receives from data of the network operations. The analytics engine 45 can analyze all or most of the paths of the network and correlate the information of the paths available (TLOCs) for routing an Application List across the SD-WAN edge devices. The analytics engine 45 as described in the steps above, can determine by statistical or predictive analysis the applications, the SLA thresholds, and the preferred path across the SD-WAN edge devices as described. The AAR policy is configured based on the information pulled from the analytics engine 45 sent to the controller 30 to create the application-aware routing policy.

FIG. 3 is an exemplary diagram of a system of the inputs to Analytics Engine which is communicatively coupled to the controller and edge devices of the network according to some embodiments. In FIG. 3, system 300 in network 100, includes the analytics engine 45 that is configured to receive inputs with information on the customer-created AAR policies 305 that have been created with an identified Application List (i.e., Application List L1 of FIG. 2) and associated thresholds that are adaptively configured based on data provided by the analytics engine 45. The analytics engine 45 also receives inputs of the current Application List information 315, traffic flow information 310 that may include the AAR policy and links for traffic routes that meet the required thresholds of the policies, and various paths (TLOCs) 320 in use.

In some embodiments, the analytic engine 45 is configured to generate one or more insights about the path for the application (i.e., the application list selected by the customer with the AAR policy and threshold) Based on its current data and analysis of real-time traffic data (e.g., via network telemetry of FNF data, network KPIs, bandwidth utilization, and capacity), the analytics engine 45 generates one or more updates that include adaptive settings to reconfigure thresholds 325 for AAR policies (i.e., dynamically update AAR policies) that have been selected by the customer, and preferred paths 330 for routes for application lists. The analytics engine 45 sends this information to the controller 30 to push the preferred path information and the updated AAR policy (reflecting the intent of the policy created by the customer) to the network devices or edge devices (10, 20).

In some embodiments, the analytics engine 45 can select or determine based on the analysis of the inputs received for AAR policies, thresholds, and route information for application lists, the availability of multiple other paths that may be more suitable for traffic flow and to suggest or provide information of preferred path selection from the multiple paths to the controller. This enables the analytics engine 45 to create AAR policies that direct the SD-WAN edge routers to route application traffic through preferred paths that meet the required or preferred SLA as has been specified in the configuration by the customer. For example, the AAR policy may be automatically updated from the input information based on the application detected and their perceived quality, or the AAR policy created by the customer may be selected based on the statistical analysis by the analytics engine 45 of all available paths or nearly all available paths.

In some embodiments, this statistical analysis may make feasible routing of traffic through paths with a lesser probability of an SLA violation which may result in a routing mechanism that is proactive rather than reactive in operation in preventing SLA violations. Also, since the analytics engine 45 is defining the SLA thresholds for an application in the AAR policy, the SLA thresholds are likely more accurate for a specific application.

Figure 4:
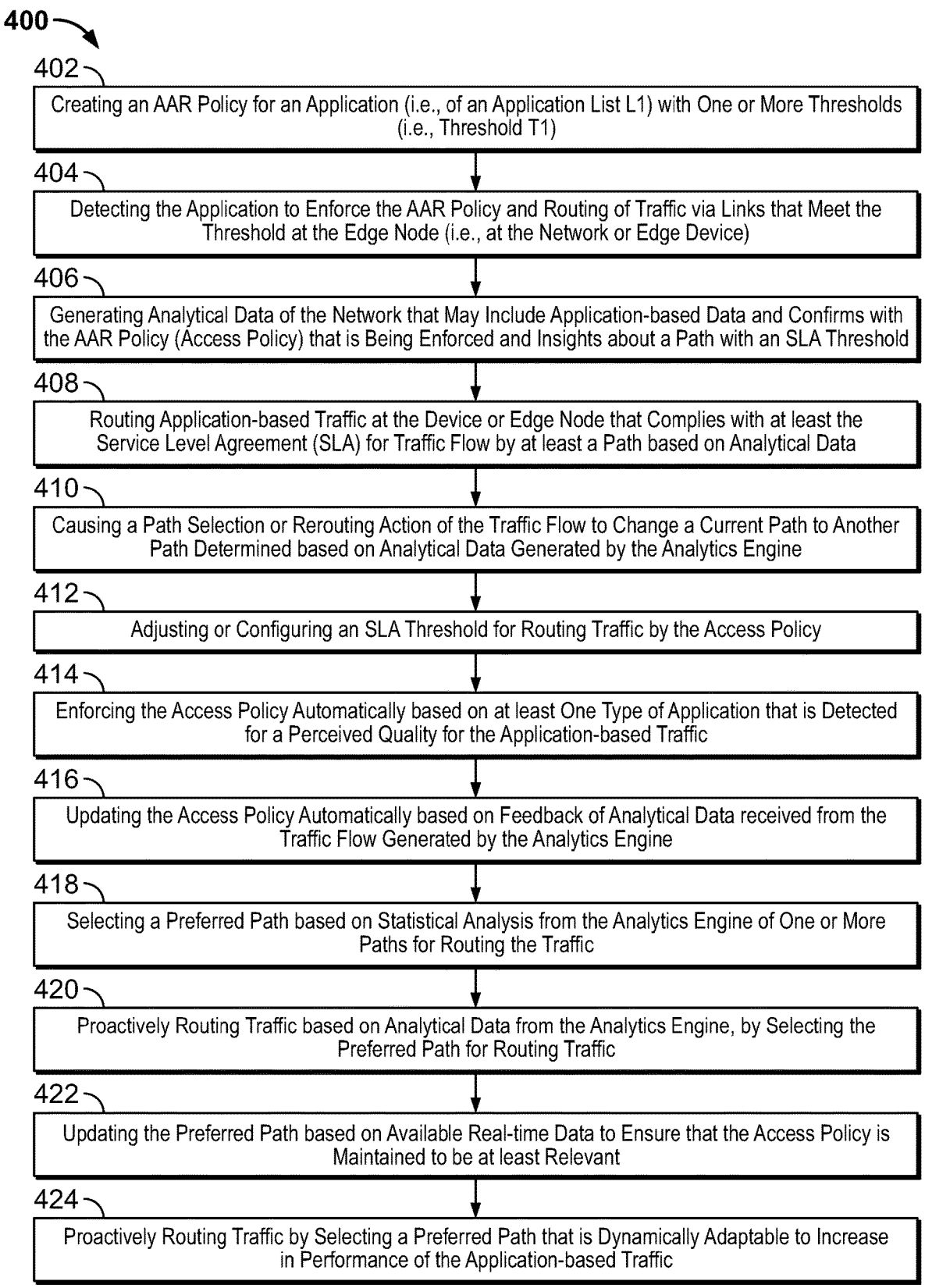
FIG. 4 illustrates an exemplary flowchart of the adaptive mechanism for AAR policies based on analytical data of traffic flow received by a controller of the network according to some embodiments.

FIG. 4 illustrates an exemplary flowchart 400 of the adaptive mechanism for AAR policies based on analytical data of traffic flow received by a controller of the network according to some embodiments. The logical operations described herein with respect to FIG. 4 may be implemented (1) as a sequence of computer-implemented acts or program modules running on a computing system and/or (2) as interconnected machine logic circuits or circuit modules within the computing system.

At 402, a computer-implemented method may be initiated that includes a customer initially creating an AAR policy for an application (i.e., of an Application List L1) with one or more thresholds (i.e., threshold T1).

At 404, controller 30 may be configured to detect the application to enforce the AAR policy and route traffic via links that meet the threshold at the edge node (i.e., at the network or edge device).

At 406, the analytics engine 45 may be configured to generate analytical data of the network that may include application-based data at the edge node, edge device, and network device, and is by at least the AAR policy (i.e., an access policy or like) that is being enforced at the device. In some embodiments, the device sends data such as network telemetry for processing by the analytics engine. In some embodiments, the analytics engine 45 is configured to generate various insights about a path of the application or a path of the application list with one or more SLA thresholds.

At 408, the controller 30 may be configured to route traffic or route application-based traffic at the device or edge node that complies with at least the Service Level Agreement (SLA) for traffic flow by at least a path of more than one available path that is determined based on analytical data.

At 410, the controller 30 may be configured to, in response to an SLA violation determined based on at least analytical data monitored or received by the analytics engine 45, cause a path selection or rerouting action of the traffic flow to change a current path to another path determined based on analytical data generated by the analytics engine 45. For example, controller 30 may cause an action of re-routing traffic flow through another path that is by at least the SLA for traffic flow based on analytical data received from the analytical engine of the traffic flow. In some embodiments, the action caused by the controller may include re-routing the traffic flow by another path that is based on the analytical data and by at least a routing policy associated with the application.

At 412, controller 30 may be configured to adjust or configure an SLA threshold for routing traffic by the routing policy. In an embodiment, the routing policy (i.e., AAR policy) may include a set of requirements associated with the application for routing of application-based data, on analytical data received of traffic at an edge node.

At 414, controller 30 may be configured to enforce the routing policy automatically based on at least one type of application that is detected for a perceived quality for the application-based traffic.

At 416, controller 30 may be configured to update automatically based on feedback of analytical data received from the traffic flow generated by the analytics engine, the routing policy at the edge node. The updated routing policy may be reflective of the intent of the routing policy associated with the application by the controller.

At 418, controller 30 may be configured to select a preferred path based on statistical analysis from the analytics engine of one or more paths for routing the traffic. The preferred path comprises a path with a similar configured SLA for routing traffic. The preferred path may be a path determined to have at least a lesser probability of an SLA violation when routing at least the application-based traffic.

At 420, controller 30 may be configured to proactively route traffic based on analytical data from the analytics engine, by selecting the preferred path for routing traffic.

At 422, controller 30 may be configured to update the preferred path based on available real-time data to ensure that the routing policy is maintained to be at least relevant for enabling routing traffic.

At 424, controller 30 may be configured to proactively route traffic by selecting a preferred path that is dynamically adaptable to attempt to cause the routing policy to have an increase in performance of the application-based traffic. In an embodiment, the controller may be configured as an SD-WAN controller.

Figure 5:
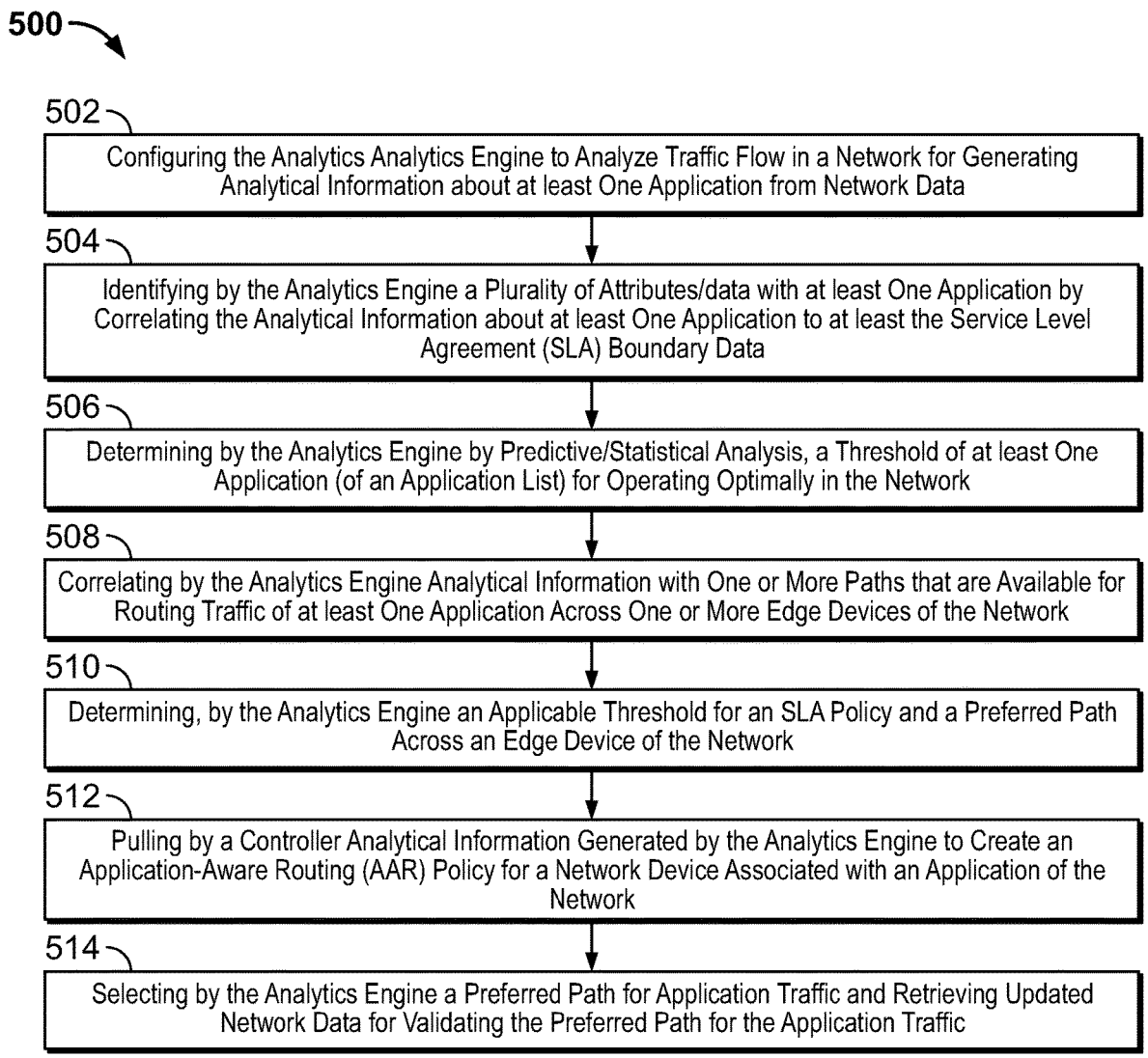
FIG. 5 illustrates an exemplary flowchart of the adaptive mechanism based on analytical data generated by the analytics engine that is received by a controller of the network according to some embodiments.

FIG. 5 illustrates an exemplary flowchart 500 of the adaptive mechanism based on analytical data generated by the analytics engine that is received by a controller of the network according to some embodiments. The logical operations described herein with respect to FIG. 5 may be implemented (1) as a sequence of computer-implemented acts or program modules running on a computing system and/or (2) as interconnected machine logic circuits or circuit modules within the computing system.

In FIG. 5, the exemplary flowchart 500 illustrates the operations of the analytics engine 45. At 502, the analytics engine 45 may be configured to analyze traffic flow in a network and to generate analytical information about at least one application from traffic data that is transmitted in the network.

At 504, the analytics engine 45 may be configured to identify a plurality of attributes and/or network data associated with at least one application by correlating the analytical information about at least one application to at least the Service Level Agreement (SLA) boundary data in which the at least one application operates in the network.

At 506, the analytics engine 45 may be configured to determine based at least on the plurality of attributes and/or network data and by applying at least predictive analysis or statistical analysis, a threshold of at least one application (of an application list) for operating optimally in the network.

At 508, the analytics engine 45 may be configured to correlate analytical information with one or more paths that are available for routing traffic of at least one application across one or more edge devices of the network.

At 510, the analytics engine 45 may be configured to determine an applicable threshold for an SLA policy and a preferred path across an edge device of the network.

At 512, the analytics engine 45 may be configured to enable a controller 30 coupled to the analytics engine to pull analytical information generated by the analytics engine to create an Application-Aware Routing (AAR) policy for at least one edge device associated with an application of the network.

At 514, the analytics engine 45 is configured to, in response to the activation of an application-aware routing policy and selecting a preferred path for application traffic by a controller 30, retrieve updated data and validate the preferred path for the application traffic based on an analysis of the updated data.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations might be performed than shown in the FIG. 5 described herein. These operations can also be performed in parallel, or in a different order than those described herein. Some or all of these operations can also be performed by components other than those specifically identified. Although the techniques described in this disclosure are with reference to specific components, in other examples, the techniques may be implemented by fewer components, more components, different components, or any configuration of components.

Figure 6:
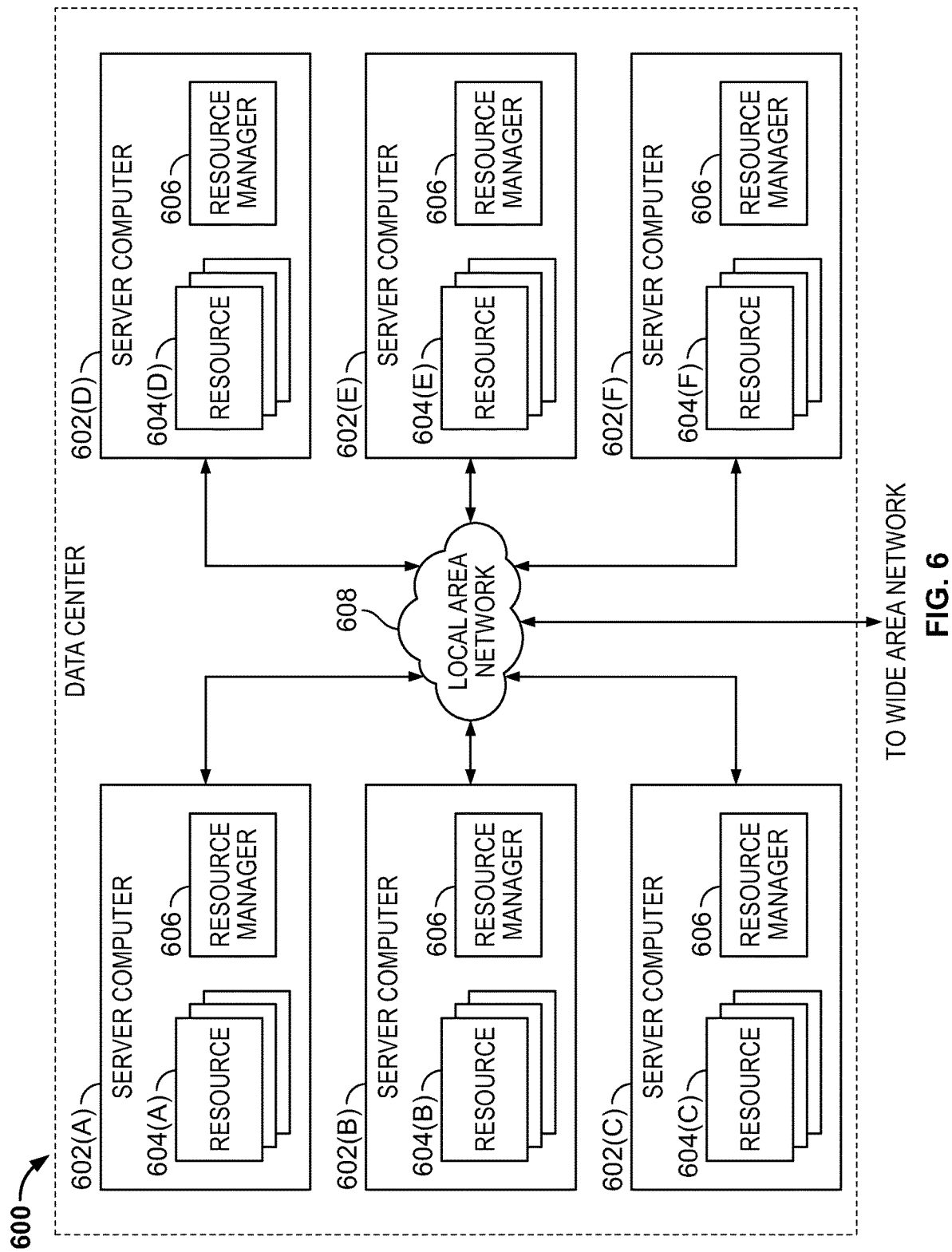
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as one or more edge nodes, devices D1, D2, controller 30, analytics engine 45, etc. Although Computers 602 may comprise any type of networked devices, such as servers, switches, routers, hubs, bridges, gateways, modems, repeaters, access points, hosts, etc.

The Computers 602 can be a standard tower, rack-mount, or blade server computer configured appropriately for providing computing resources. In some examples, computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 402. Computers 602 in the data center 600 can also be configured to provide network services and other types of services.

In the example, data center 600 shown in FIG. 6, an appropriate local area network (LAN) 608 is also utilized to interconnect the computers 602A-602F. It should be appreciated that the configuration and network topology described herein have been greatly simplified and that many more computing systems, software components, networks, and networking devices can be utilized to interconnect the various computing systems disclosed herein and to provide the functionality described above Appropriate load balancing devices or other types of network infrastructure components can also be utilized for balancing a load between data centers 600, between each of the computers 602A-602F in each data center 600, and, potentially, between computing resources in each of the computers 602. It should be appreciated that the configuration of the data center 600 described with reference to FIG. 6 is merely illustrative and that other implementations can be utilized.

In some examples, the computers 602 may each execute one or more application containers and/or virtual machines to perform the techniques described herein. For instance, the containers and/or virtual machines may serve as nodes in the cloud computing network 100, such as edge nodes (i.e., devices 10 and/or 20).

In some instances, the Data Center 600 may provide computing resources, like application containers, VM instances, and storage, on a permanent or as-needed basis Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The Data Centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
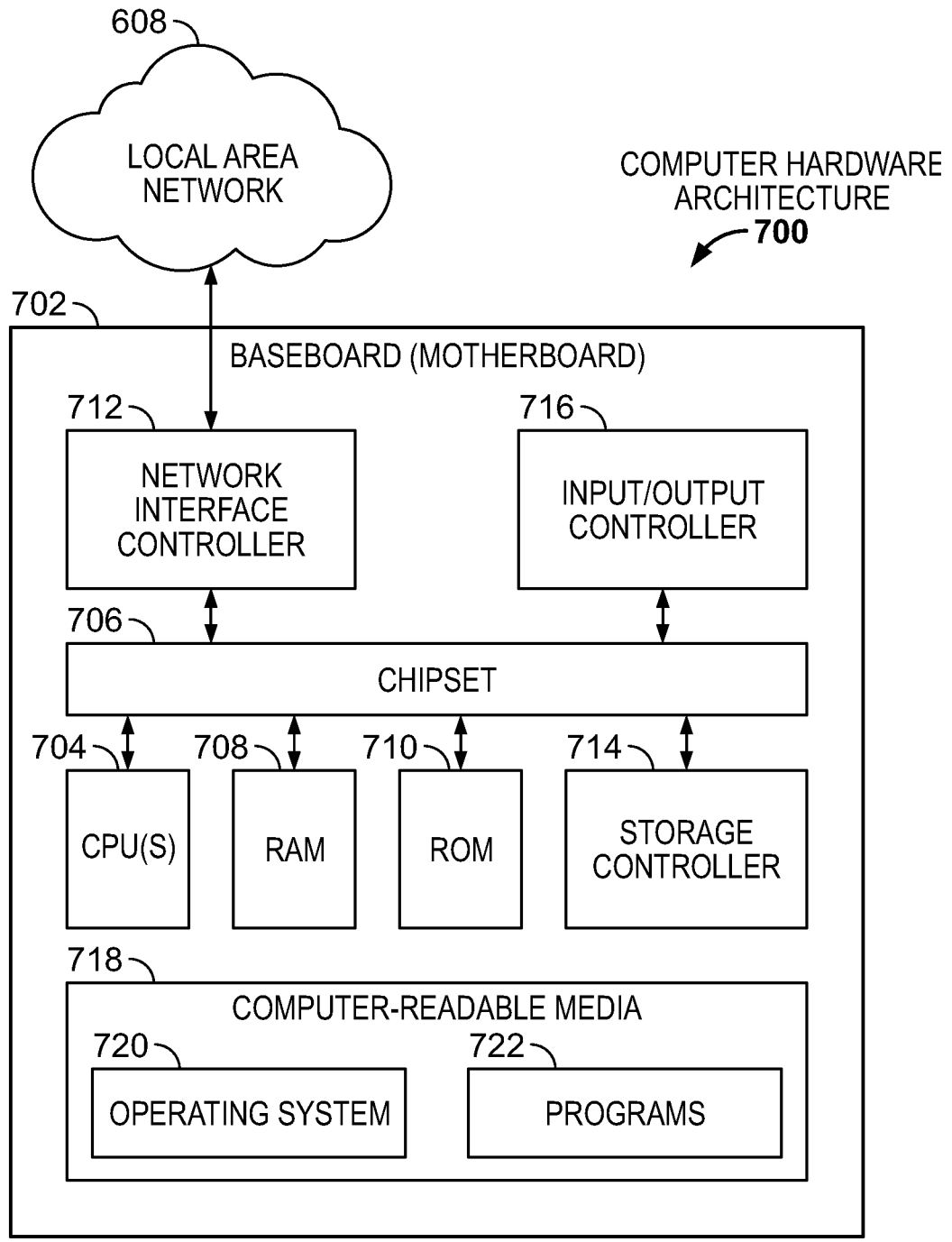
FIG. 7 is a computer architecture diagram showing an illustrative computer hardware architecture for implementing a computing device that can be utilized to implement aspects of the various technologies presented herein.

FIG. 7 shows an example of computer architecture 700 for a computer 602 (of FIG. 6) capable of executing program components for implementing the functionality described above. The computer architecture is shown in FIG. 7 illustrates a conventional server computer, workstation, desktop computer, laptop, tablet, network appliance, e-reader, smartphone, and/or other computing device, and can be utilized to execute any of the software components presented herein. The Computer 602 may, in some examples, correspond to a physical device described herein (e.g., edge nodes, map server, authentication server, host devices, source devices, destination devices), and may comprise networked devices such as servers, switches, routers, hubs, bridges, gateways, modems, repeaters, access points, etc. For instance, computer 602 may correspond to edge node 10 and/or controller 30 and/or analytics engine 45.

As shown in FIG. 7, computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPU 704 can be a standard programmable processor that performs arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPU 704 and the remainder of the components and devices on the baseboard 702. The chipset 706 can provide an interface to a RAM 708, used as the main memory in the computer 602. The chipset 706 can further provide an interface to a computer-readable storage medium such as read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of computer 602 in accordance with the configurations described herein.

The Computer 602 can operate in a networked environment using logical connections to remote computing devices and computer systems through a network, such as Network 100. The chipset 706 can include functionality for providing network connectivity through a network interface controller (NIC) 512, such as a gigabit Ethernet adapter. The NIC 712 is capable of connecting computer 602 to other computing devices over the network 100. For instance, in the example shown in FIG. 7, NIC 712 may help facilitate example sharing of analytical data of network 100 with controller 30. As shown in FIG. 7, NIC 712 may also help facilitate the download of a routing policy and/or multiple policies from an authentication server or the like. NIC 712 may also help facilitate a data transfer from the edge node. It should be appreciated that multiple NICs 712 can be present in computer 602, connecting the computer to other types of networks and remote computer systems.

The Computer 602 can be connected to a storage device 718 (e.g., configured with a computer-readable media) that provides non-volatile storage for the computer. The storage device 718 can store an operating system 720, programs 722, policies (including AAR policies), and/or data (including analytical data), which have been described in greater detail herein. The storage device 718 can be connected to the computer 602 through a storage controller 714 connected to the chipset 706, for example. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of the physical state can depend on various factors, in different embodiments of this description. Examples of such factors can include but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from storage device 718 by detecting the physical states or characteristics of one or more particular locations within the physical storage units.

In addition to the mass storage device 718 described above, the computer 602 can have access to other computer-readable storage media (in the storage device 718) to store and retrieve information, such as policies, program modules, data structures, and/or other data. It should be appreciated by those skilled in the art that computer-readable storage media is any available media that provides for the non-transitory storage of data and that can be accessed by the computer 602. In some examples, the operations performed by the network 100, and or any components included therein may be supported by one or more devices similar to Computer 602. Stated otherwise, some or all of the operations performed by network 100, and or any components included therein, may be performed by one or more computers 602 operating in a cloud-based arrangement.

By way of example, and not limitation, computer-readable storage media can include volatile and non-volatile, removable, and non-removable media implemented in any method or technology. Computer-readable storage media includes but is not limited to, RAM, ROM, erasable programmable ROM ("EPROM"), electrically-erasable programmable ROM ("EEPROM"), flash memory, or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants.

It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPU 704 transitions between states, as described above. According to one embodiment, computer 602 has access to computer-readable storage media storing computer-executable instructions which, when executed by computer 602, perform the various processes described above with regard to FIGS. 1-5. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that computer 602 might not include all of the components shown in FIG. 7, can include other components that are not explicitly shown in FIG. 7, or might utilize an architecture completely different than that shown in FIG. 7.

As described herein, the computer 602 may comprise one or more devices, such as edge nodes and/or, controller 30, analytics engine 45, and/or other devices. The Computer 602 may include one or more hardware processors (CPU 704) configured to execute one or more stored instructions. The processor(s) (CPUs 704) may comprise one or more cores. Further, computer 602 may include one or more network interfaces configured to provide communications between computer 602 and other devices, such as the communications described herein as being performed by edge nodes, controller 30, and other devices of FIGS. 1-5. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

Programs 722 may comprise any type of programs or processes to perform the techniques described in this disclosure in accordance with conversation-based policy distribution techniques. For instance, program 722 may cause computer 602 to perform techniques for communicating with other devices using any type of protocol or standard usable for determining connectivity. Additionally, program 722 may comprise instructions that cause computer 602 to perform the specific techniques for conversation-based policy distribution, such as specifying, identifying, downloading, installing, and/or deleting policies.

Clause 1. A computer-implemented method comprising: detecting, by a controller, an application for use at an edge node of a network: generating, by an analytics engine coupled to the controller, analytical data of traffic flow of the network wherein the traffic flow is in accordance with at least a routing policy for routing traffic associated with the application, routing, by the controller, the traffic through a path comprising one or more paths configured at an edge node that is in accordance with at least a Service Level Agreement (SLA) for traffic flow; and in response to an SLA violation during routing of the traffic, causing an action, by the controller, of re-routing traffic flow through another path that is in accordance with at least the SLA for traffic flow based on analytical data received from the analytics engine of the traffic flow.

Clause 2. The computer-implemented method of clause 1, wherein the action caused by the controller comprises re-routing the traffic flow by another path that is based on the analytical data and in accordance with at least a routing policy associated with the application.

Clause 3. The computer-implemented method of clause 1, further comprising, configuring, by the controller, an SLA threshold for routing traffic in accordance with the routing policy that comprises a set of requirements associated with the application for routing of application-based traffic on analytical data received of traffic at an edge node.

Clause 4. The computer-implemented method of clause 3, further comprising: enforcing, by the controller, a routing policy automatically based on at least one type of application that is detected for a perceived quality for the application-based traffic.

Clause 5. The computer-implemented method of clause 3, further comprising, updating automatically, by the controller, based on feedback analytical data received of the traffic flow generated by the analytics engine, the routing policy at the edge node.

Clause 6. The computer-implemented method of clause 5, wherein an updated routing policy is reflective of an intent of the routing policy associated with the application by the controller.

Clause 7. The computer-implemented method of clause 4, further comprising: configuring, by the controller, a preferred path based on statistical analysis from the analytics engine of one or more paths for routing the traffic.

Clause 8. The computer-implemented method of clause 7, wherein the preferred path comprises a path with a similar configured SLA for routing traffic.

Clause 9. The computer-implemented method of clause 8, wherein the preferred path comprises a path determined to have at least a lesser probability of an SLA violation when routing at least the application-based traffic.

Clause 10. The computer-implemented method of clause 9, further comprising: proactively routing traffic by the controller based on analytical data from the analytics engine, by selecting the preferred path for routing traffic.

Clause 11. The computer-implemented method of clause 9, further comprising: updating, by the controller, the preferred path based on available real-time data for ensuring that the routing policy is maintained to be at least relevant for enabling routing traffic.

Clause 12. The computer-implemented method of clause 10, wherein proactively routing traffic further comprises: selecting, by the controller, a preferred path that is dynamically adaptable to at least attempt to cause the routing policy to have an increase in performance of the application-based traffic.

Clause 13. The computer-implemented method of clause 1, wherein the controller comprises an SD-WAN controller.

Clause 14. A system comprising: an analytics engine that analyzes traffic flow in a network and is configured to: generate analytical information about at least one application from traffic data that is transmitted in the network; identify a plurality of attributes associated with the at least one application by correlating the analytical information about the at least one application to at least Service Level Agreement (SLA) boundary data in which the at least one application operates in the network; and determine based at least on the plurality of attributes and by applying at least predictive analysis, a threshold of the SLA associated with at least one application for operating optimally in the network.

Clause 15. The system of clause 14, wherein the analytics engine is further configured to: correlate analytical information with one or more paths that are available for routing traffic of at least one application across one or more edge devices of the network.

Clause 16. The system of clause 15, wherein the analytics engine is further configured to: determine an applicable threshold for an SLA policy and a preferred path across an edge device of the network.

Clause 17. The system of clause 16, wherein the analytics engine is further configured to: enable a controller coupled to the analytics engine to pull analytical information generated by the analytics engine to create an application aware routing policy for at least one edge device associated with an application of the network.

Clause 18. The system of clause 14, wherein the analytics engine is further configured to: in response to activation of an application-aware routing policy and selection of a preferred path for application traffic by a controller, retrieve updated data and validate the preferred path for the application traffic based on an analysis of the updated data.

Clause 19. A computing device comprising: one or more processors; and one or more non-transitory computer-readable media storing computer-executable instructions that, when executed by the one or more processors, cause the one or more processors to: detect an application initiated for use at an edge node of a network: generate analytical data of traffic flow at the edge node of the network wherein the traffic flow is in accordance with a routing policy for routing traffic associated with the application; route traffic through a path of one or more paths configured at the edge node that is in accordance with a Service Level Agreement (SLA) for traffic flow; and in response to an SLA violation during routing of traffic, re-route traffic through another path that is in accordance with at least the SLA for traffic flow based on analytical data received of the traffic flow in the network.

Clause 20. The computing device of clause 19, wherein the computer-executable instructions further cause the one or more processors to: configure an SLA threshold for routing traffic in accordance with the routing policy that comprises a set of requirements associated with the application for routing of application-based traffic using analytical data received of traffic at an edge node.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
    enabling, by a controller, an application for use at an edge node of a network;
    processing, by the application being executed by the controller, traffic flow being received at the edge node of the network;
    producing, by an analytics engine associated with the controller, analytical data based on traffic flow at the edge node, wherein the traffic flow is determined to be consistent with at least a routing policy for routing traffic at the edge node by the application;
    routing, by the controller, the traffic flow through a first path comprising one or more paths configured at an edge node that is consistent with at least a Service Level Agreement (SLA) for the traffic flow as determined by the application;
    in response to an SLA violation during routing of the traffic, causing, by the controller, re-routing of the traffic flow through a second path that is consistent with at least the SLA for traffic flow at the edge node; and
    validating, by the analytics engine, the re-routing of the traffic flow by the controller through the second path using newly received analytical data of the traffic flow.

2. The computer-implemented method of claim 1, re-routing, by the controller, the traffic flow by the second path that is based in part on the newly received analytical data and is consistent with at least a routing policy at the edge node by the application.

3. The computer-implemented method of claim 1, further comprising:
    configuring, by the controller using the application, an SLA threshold for routing the traffic flow consistent with the routing policy at the edge node that comprises a set of requirements configured by the application for routing of application-based traffic based in part on analyzing newly received analytical data of the traffic flow at the edge node.

4. The computer-implemented method of claim 3, further comprising:
    enforcing automatically, by the controller, a routing policy which has been determined by the controller to be based on at least one type of application that is being used by for the controller for a perceived quality for the application-based traffic.

5. The computer-implemented method of claim 4, further comprising:
    configuring, by the controller, a preferred path based on statistical analysis from the analytics engine of one or more paths for routing the traffic wherein the statistical analysis is based in part on newly received analytical data by the analytics engine.

6. The computer-implemented method of claim 5, wherein the preferred path comprises a path with a similar configured SLA for routing traffic based in part on newly received analytical data by the analytics engine.

7. The computer-implemented method of claim 6, wherein the preferred path comprises a path determined to have at least a lesser probability of an SLA violation when routing at least the application-based traffic based in part on newly received analytical data by the analytics engine.

8. The computer-implemented method of claim 7, further comprising:
    proactively routing traffic by the controller based on newly received analytical data by the analytics engine, by selecting the preferred path for routing traffic.

9. The computer-implemented method of claim 8, wherein proactively routing traffic further comprises:
  selecting, by the controller, a preferred path that is dynamically adaptable to at least attempt to cause the routing policy to have an increase in performance of the application-based traffic.

10. The computer-implemented method of claim 7, further comprising:
  updating, by the controller, the preferred path based on available real-time data for ensuring that the routing policy is maintained to be at least relevant for enabling routing traffic comprising using newly received analytical data by the analytics engine.

11. The computer-implemented method of claim 3, further comprising:
  updating automatically, by the controller, based on feedback by analyzing newly received analytical data of the traffic flow at the edge node by the analytics engine, the routing policy for use at the edge node.

12. The computer-implemented method of claim 11, wherein an updated routing policy that has been automatically updated by the controller is reflective of an intent of the routing policy associated with the application by the controller.

13. The computer-implemented method of claim 1, wherein the controller comprises an SD-WAN controller.

14. A computing device comprising:
  one or more processors; and
  one or more non-transitory computer-readable media storing computer executable instructions that, when executed by the one or more processors, cause the one or more processors to:
  enable an application initiated for use at an edge node of a network;
  receive traffic flow to produce analytical data of the traffic flow at the edge node of the network;
  process the analytical data of the traffic flow being received at the edge node of the network wherein the traffic flow is being determined to be at least in accordance with a routing policy for routing the traffic flow at the edge node by the application;
  route the traffic flow through a first path of one or more paths configured at the edge node that is consistent with a Service Level Agreement (SLA) for the traffic flow as determined by the application;
  in response to an SLA violation during routing of the traffic flow, re-route the traffic flow through a second path that is consistent with at least the SLA for the traffic flow based on newly received analytical data of the traffic flow in the network; and
  validate re-route of the traffic flow through the second path using newly received analytical data of the traffic flow.

15. The computing device of claim 14, wherein the computer executable instructions further cause the one or more processors to:
  configure an SLA threshold using the application for routing traffic flow consistent with the routing policy that comprises a set of requirements configured by the application for routing of application-based traffic using the newly received analytical data of the traffic flow at the edge node.

16. A system comprising:
  a processor configured to detect an application initiated for use at an edge node of a network and analyze traffic flow in a network and is configured to:
  process via the application, traffic flow being received at the edge node of the network;
  generate analytical information about at least one application from traffic data that is transmitted in the network;
  route traffic through a path comprising one or more paths configured at an edge node that is in accordance with at least a Service Level Agreement (SLA) for traffic flow;
  in response to an SLA violation during routing of the traffic, cause re-routing traffic flow through another path that is consistent with at least the SLA for traffic flow based on analytical data received; and
  validate re-routing of the traffic flow through another path using newly received analytical data of the traffic flow.

17. The system of claim 16, wherein the processor is further configured to:
  identify a plurality of attributes associated with the at least one application by correlating the analytical information about the at least one application to at least SLA boundary data in which the at least one application operates in the network.

18. The system of claim 17, wherein the processor is further configured to:
  determine an applicable threshold for an SLA policy and a preferred path across an edge device of the network.

19. The system of claim 17, wherein the processor is further configured to:
  pull analytical information to create an application aware routing policy for at least one edge device associated with an application of the network.

20. The system of claim 17, wherein the processor is further configured to:
  in response to an activation of an application-aware routing policy and selection of a preferred path for application traffic, retrieve updated data and validate the preferred path for the application traffic based on an analysis of the newly received analytical data.

* * * * *